United States Patent
Takamatsu

(10) Patent No.: US 10,545,331 B2
(45) Date of Patent: Jan. 28, 2020

(54) LIGHT SOURCE APPARATUS AND IMAGE DISPLAY APPARATUS

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/079,134

(22) PCT Filed: Feb. 6, 2017

(86) PCT No.: PCT/JP2017/004239
§ 371 (c)(1),
(2) Date: Aug. 23, 2018

(87) PCT Pub. No.: WO2017/175467
PCT Pub. Date: Oct. 12, 2017

(65) Prior Publication Data
US 2019/0072759 A1 Mar. 7, 2019

(30) Foreign Application Priority Data

Apr. 4, 2016 (JP) .................................. 2016-075100

(51) Int. Cl.
*G02B 27/00* (2006.01)
*G03B 21/14* (2006.01)
(Continued)

(52) U.S. Cl.
CPC ....... *G02B 27/0006* (2013.01); *G02B 17/023* (2013.01); *G03B 21/145* (2013.01); *G03B 21/204* (2013.01); *G03B 21/2066* (2013.01)

(58) Field of Classification Search
CPC ...... G03B 21/14; G03B 21/18; G03B 21/145; G03B 21/204; G03B 21/2066; G03B 21/2093; G02B 27/0006
See application file for complete search history.

(56) References Cited

U.S. PATENT DOCUMENTS

2012/0249981 A1* 10/2012 Hirosawa ........... G03B 21/2033
353/100
2013/0308104 A1 11/2013 Nishimori et al.
(Continued)

FOREIGN PATENT DOCUMENTS

| JP | 2011-75657 | 4/2011 |
| JP | 2012-18762 A | 1/2012 |

(Continued)

OTHER PUBLICATIONS

International Search Report dated Apr. 25, 2017, in PCT/JP2017/004239, filed Feb. 6, 2017.

*Primary Examiner* — Sultan Chowdhury
(74) *Attorney, Agent, or Firm* — Oblon, McClelland, Maier & Neustadt, L.L.P.

(57) ABSTRACT

A light source apparatus according to an embodiment of the present technology includes a first unit and a second unit. The first unit includes a light source portion and a first dustproof structure portion that covers the light source portion. The second unit is connected to the first unit and includes a light-emitting body that emits visible light by being excited by emission light emitted from the light source portion and a second dustproof structure portion that covers the light-emitting body.

19 Claims, 10 Drawing Sheets

(51) Int. Cl.
*G02B 17/02* (2006.01)
*G03B 21/20* (2006.01)

(56) References Cited

U.S. PATENT DOCUMENTS

| | | | |
|---|---|---|---|
| 2014/0168616 A1 | 6/2014 | Namba | |
| 2014/0176915 A1 | 6/2014 | Yamamoto et al. | |
| 2015/0036107 A1* | 2/2015 | Nagahara | G03B 21/208 353/31 |
| 2015/0092164 A1* | 4/2015 | Lin | G03B 21/16 353/57 |
| 2015/0219330 A1 | 8/2015 | Pastrik et al. | |
| 2015/0277217 A1 | 10/2015 | Takamatsu et al. | |
| 2016/0077414 A1* | 3/2016 | Nishiyama | H04N 9/3111 348/748 |

FOREIGN PATENT DOCUMENTS

| | | |
|---|---|---|
| JP | 2014-85623 A | 5/2014 |
| JP | 2014-123014 A | 7/2014 |
| JP | 2014-139659 A | 7/2014 |
| JP | 2014-199790 A | 10/2014 |

\* cited by examiner

LIGHT SOURCE APPARATUS AND IMAGE DISPLAY APPARATUS

TECHNICAL FIELD

The present technology relates to an image display apparatus such as a projector and a light source apparatus applicable to the image display apparatus.

BACKGROUND ART

From the past, image display apparatuses such as a projector have been widely used. For example, light from a light source is modulated by a light modulation device such as a liquid crystal device, and the modulated light is projected onto a screen or the like so as to display an image. As the light source, a mercury lamp, a xenon lamp, an LED (Light Emitting Diode), an LD (Laser Diode), or the like is used. Of those, a solid-state light source such as an LED and an LD has advantages that a lifetime is long and thus lamp exchange as in the past is unnecessary and that the light source is lit immediately after power is turned on.

For example, Patent Literature 1 describes a light source device that uses a plurality of laser light sources, and an image display device that uses this. In the light source device described in Patent Literature 1, a light source part, a light collection optical system, a phosphor wheel, and a light-emitting lens are arranged in a casing. Blue laser light emitted from the light source part is collected on a phosphor provided on the phosphor wheel by the light collection optical system. By excitation, the phosphor converts a part of the blue laser light into yellow fluorescence and transmits another part of the light therethrough. As a result, white light obtained by synthesizing the blue laser light and yellow light is emitted via the light-emitting lens (paragraphs [0035] to [0039] of Patent Literature 1, etc.).

CITATION LIST

Patent Literature

Patent Literature 1: Japanese Patent Application Laid-open No. 2014-085623

DISCLOSURE OF INVENTION

Technical Problem

It is considered that projectors that use laser light sources will continue to prevail in the future, and thus various specification changes may be required for the light source apparatus. Further, it is also important to prevent dust and the like from influencing the light source, the optical system, and the like.

In view of the circumstances as described above, an object of the present technology is to provide a light source apparatus and an image display apparatus that are capable of flexibly coping with specification changes and preventing an influence of dust and the like.

Solution to Problem

To attain the object described above, a light source apparatus according to an embodiment of the present technology includes a first unit and a second unit.

The first unit includes a light source portion and a first dustproof structure portion that covers the light source portion.

The second unit is connected to the first unit and includes a light-emitting body that emits visible light by being excited by emission light emitted from the light source portion and a second dustproof structure portion that covers the light-emitting body.

In this light source apparatus, the first unit including the light source portion and the second unit including the light emitting body are configured, and these are connected to each other. Accordingly, it becomes possible to flexibly cope with a specification change regarding the light source portion, a specification change regarding the light-emitting body, and the like. Further, since the first and second units respectively include the first and second dustproof structure portions, it becomes possible to prevent an influence of dust and the like.

The first dustproof structure portion may include a first casing portion including a first light-emitting port from which the emission light exits, the first casing portion forming a first space including the light source portion.

By the first casing portion, a dustproof effect can be exhibited.

The second dustproof structure portion may include a second casing portion that includes a light-incident port that the emission light emitted from the first light-emitting port enters and a second light-emitting port from which light including the visible light exits, the second casing portion forming a second space including the light-emitting body.

By the second casing portion, the dustproof effect can be exhibited.

Either one of the first light-emitting port and the light-incident port may be an opening. In this case, the first casing portion and the second casing portion may be mutually connected such that the opening is hermetically sealed and each of the first space and the second space becomes a sealed space or a part of the sealed space.

When the first and second casing portions are connected to each other, each of the first and second spaces becomes the sealed space or a part of the sealed space. As a result, the influence of dust and the like can be prevented.

Each of the first light-emitting port and the light-incident port may be an opening. In this case, the first casing portion and the second casing portion may be mutually connected such that the first light-emitting port and the light-incident port are in communication with each other and a sealed space including the first space and the second space is formed.

When the first and second casing portions are connected to each other, the entire first and second spaces become a sealed space. As a result, the influence of dust and the like can be prevented.

The first dustproof structure portion may include a sealing member provided in a periphery of the first light-emitting port.

By the sealing member, the dustproof effect can be improved.

The second dustproof structure portion may include a sealing member provided in a periphery of the light-incident port.

By the sealing member, the dustproof effect can be improved.

Each of the first space and the second space may be a sealed space.

As a result, the influence of dust and the like can be prevented.

The first unit may include a light source unit including the light source portion. In this case, the first casing portion may include a light-incident port that the emission light enters and may be connected to the light source unit.

By configuring the light source unit, it becomes possible to flexibly cope with the specification change regarding the light source portion.

The first unit may include an optical system unit including an optical system that collects the emission light in the light-emitting body and the first casing portion that accommodates the optical system in the first space. In this case, the second unit may be connected to the optical system unit.

By configuring the optical system unit separately from the optical system unit, it becomes possible to flexibly cope with the specification change regarding the optical system. Further, since the optical system is accommodated in the first space, the influence of dust and the like can be prevented.

The first dustproof structure portion may include a sealing member provided in a periphery of the light-incident port of the first casing portion.

By the sealing member, the dustproof effect can be improved.

The light source apparatus may further include a base portion that supports each of the first unit and the second unit in a predetermined positional relationship.

Accordingly, it becomes possible to easily perform positioning of the first and second units, and the like, and easily assemble the light source apparatus.

The first unit may emit the emission light along a first optical axis. In this case, the second unit may emit light including the visible light along a second optical axis. Further, the first unit and the second unit may be mutually connected in a state where the first optical axis and the second optical axis are arranged on the same straight line, along a direction of the straight line.

Accordingly, it becomes possible to prevent deviation of the optical axis at a time of connection.

The light source apparatus may further include a third unit that is connected to the first unit and includes an optical system that collects the emission light in the light-emitting body and a third dustproof structure portion that covers the optical system. In this case, the second unit may be connected to the first unit via the third unit.

By configuring the third unit including the optical system, it becomes possible to flexibly cope with the specification change regarding the optical system. Further, the influence of dust and the like can be prevented by the third dustproof structure portion.

The third dustproof structure portion may include an optical system casing portion including a light-incident port that the emission light emitted from the first unit enters and a light-emitting port from which light collected by the optical system exits, the optical system casing portion forming an optical system space including the optical system.

By the optical system casing portion, the dustproof effect can be exhibited.

The optical system space may be in communication with at least one of a light source portion space including the light source portion and a light-emitting body space including the light-emitting body, and become a part of a predetermined sealed space.

Since the sealed space including the optical system space is configured, the influence of dust and the like can be prevented.

The optical system space may be a sealed space.

Accordingly, the influence of dust and the like can be prevented.

An image display apparatus according to an embodiment of the present technology includes a light source apparatus, an image generation system, and a projection system.

The light source apparatus includes the first unit and the second unit.

The image generation system includes an image generation device that generates an image on a basis of irradiated light, and an illumination optical system that irradiates light from the light source apparatus onto the image generation device.

The projection system projects an image generated by the image generation device.

Advantageous Effects of Invention

As described above, according to the present technology, it becomes possible to flexibly cope with a specification change and prevent an influence of dust and the like. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

[Image Display Apparatus]

Figure 1:
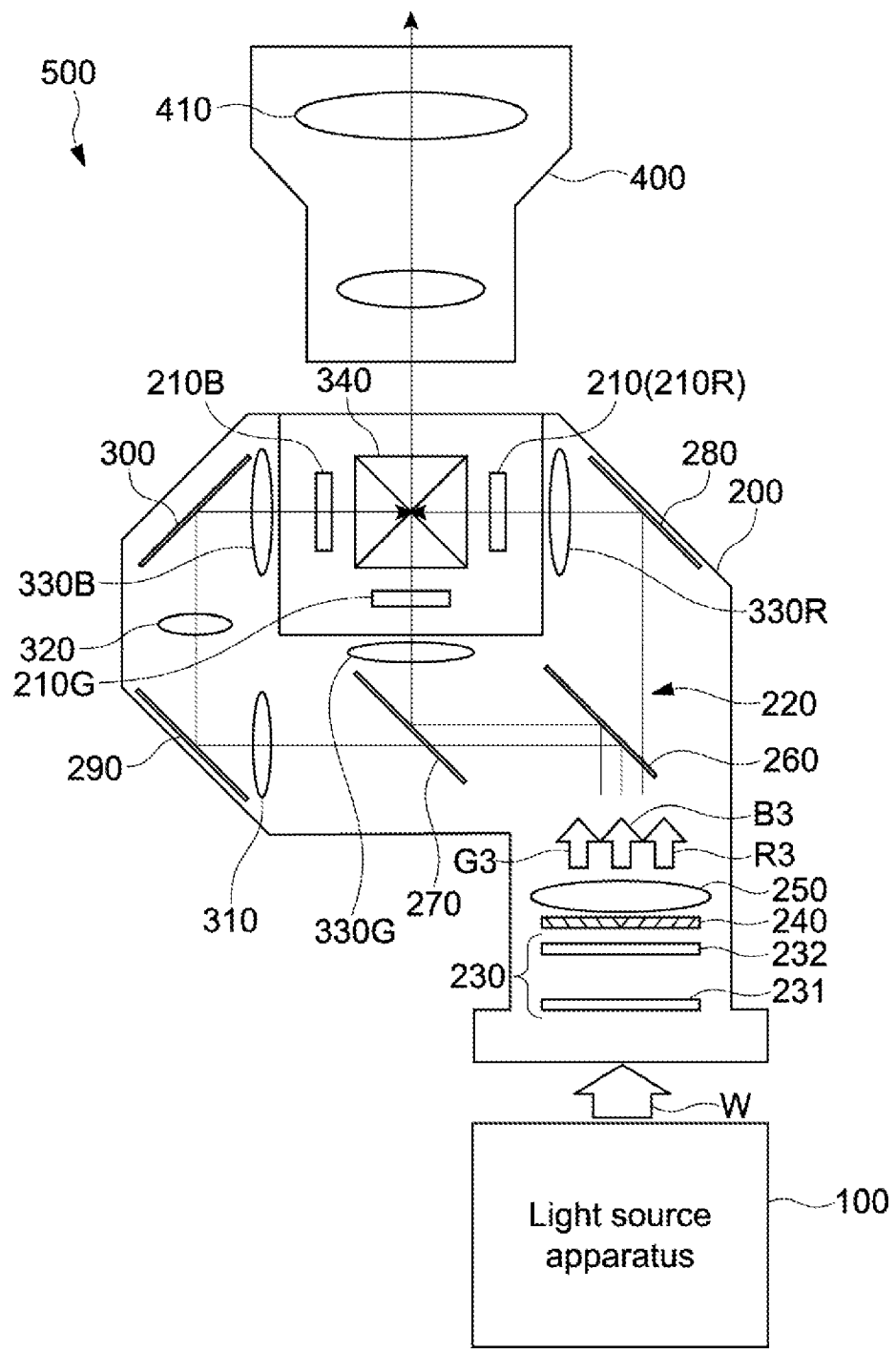
FIG. 1 A schematic diagram showing a configuration example of an image display apparatus according to an embodiment of the present technology.

FIG. 1 is a schematic diagram showing a configuration example of an image display apparatus according to an embodiment of the present technology. The image display apparatus 500 is used as a projector for presentations or digital cinema, for example. The present technology described below is also applicable to image display apparatuses used for other purposes.

The image display apparatus 500 includes a light source apparatus 100 capable of emitting white light W, an image generation system 200 that generates an image on the basis of white light W emitted from the light source apparatus 100, and a projection system 400 that projects the image generated by the image generation system 200 onto a screen (not shown) or the like.

The image generation system 200 includes an image generation device 210 that generates an image on the basis of irradiated light and an illumination optical system 220 that irradiates light emitted from the light source apparatus 100 onto the image generation device 210. Further, the image generation system 200 includes an integrator device 230, a polarization conversion device 240, and a condenser lens 250.

The integrator device 230 includes a first fly-eye lens 231 including a plurality of microlenses arranged two-dimensionally and a second fly-eye lens 232 including a plurality of microlenses arranged so as to respectively correspond to the microlenses of the first fly-eye lens 231.

White light W that enters the integrator device 230 from the light source apparatus 100 is split into a plurality of light fluxes by the microlenses of the first fly-eye lens 231, and the light fluxes are respectively imaged on the corresponding microlenses of the second fly-eye lens 232. Each of the microlenses of the second fly-eye lens 232 functions as a secondary light source, and a plurality of parallel light beams having uniform luminance are irradiated onto the polarization conversion device 240 as incident light.

As a whole, the integrator device 230 includes a function of arranging the incident light irradiated onto the polarization conversion device 240 from the light source apparatus 100 into a uniform luminance distribution.

The polarization conversion device 240 includes a function of aligning polarization states of incident light that enters via the integrator device 230 and the like. White light including blue light B3, green light G3, and red light R3 is emitted from the polarization conversion device 240 via the condenser lens 250 and the like.

The illumination optical system 220 includes dichroic mirrors 260 and 270, mirrors 280, 290, and 300, relay lenses 310 and 320, field lenses 330R, 330G, and 330B, liquid crystal light bulbs 210R, 210G, and 210B as the image generation device, and a dichroic prism 340.

The dichroic mirrors 260 and 270 include a property of selectively reflecting color light of a predetermined wavelength range and transmitting light of other wavelength ranges. Referring to FIG. 1, for example, the dichroic mirror 260 selectively reflects the green light G3 and the blue light B3. The dichroic mirror 270 selectively reflects the green light G3 out of the green light G3 and blue light B3 reflected by the dichroic mirror 260. The remaining blue light B3 is transmitted through the dichroic mirror 270. Accordingly, the light emitted from the light source apparatus 100 is separated into a plurality of color light beams of different colors. It should be noted that a configuration for separating light into a plurality of color light beams, devices used, and the like are not limited.

The separated red light R3 is reflected by the mirror 280, collimated by passing through the field lens 330R, and then enters the red-light modulation liquid crystal light bulb 210R. The green light G3 is collimated by passing through the field lens 330G and then enters the green-light modulation liquid crystal light bulb 210G. The blue light B3 passes through the relay lens 310 to be reflected by the mirror 290, and further reflected by the mirror 300 after passing through the relay lens 320. The blue light B3 reflected by the mirror 300 is collimated by passing through the field lens 330B and then enters the blue-light modulation liquid crystal light bulb 210B.

The liquid crystal light bulbs 210R, 210G, and 210B are electrically connected to a signal source (e.g., PC etc.) (not shown) that supplies image signals including image information. The liquid crystal light bulbs 210R, 210G, and 210B modulate incident light for each pixel on the basis of supplied image signals of the respective colors, and thus generate a red image, a green image, and a blue image, respectively. The modulated light beams of the respective colors (formed images) enter the dichroic prism 340 to be synthesized. The dichroic prism 340 synthesizes the light by superimposing the light beams of the respective colors that have entered from 3 directions, and emits it toward the projection system 400.

The projection system 400 projects the image generated by the image generation device 210. The projection system 400 includes a plurality of lenses 410 and the like, and irradiates the light synthesized by the dichroic prism 340 onto a screen (not shown) or the like. As a result, a full color image is displayed.

[Light Source Apparatus]

Figure 2:
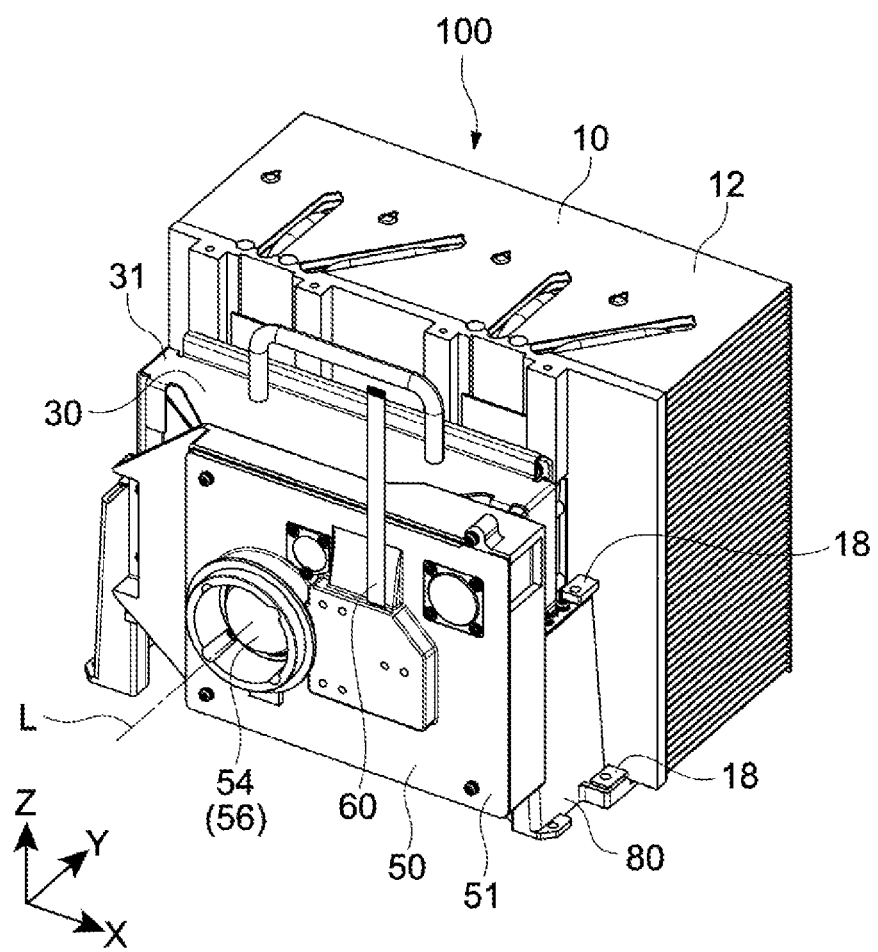
FIG. 2 A perspective view showing a configuration example of a light source apparatus.
Figure 3:
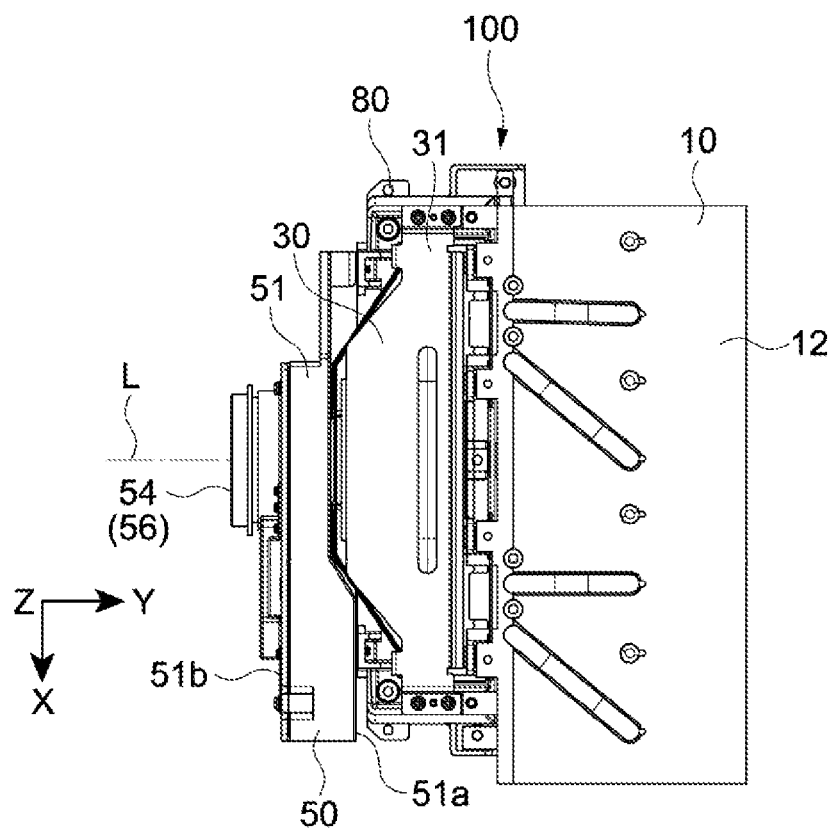
FIG. 3 A plan view of the light source apparatus viewed from above.
Figure 4:
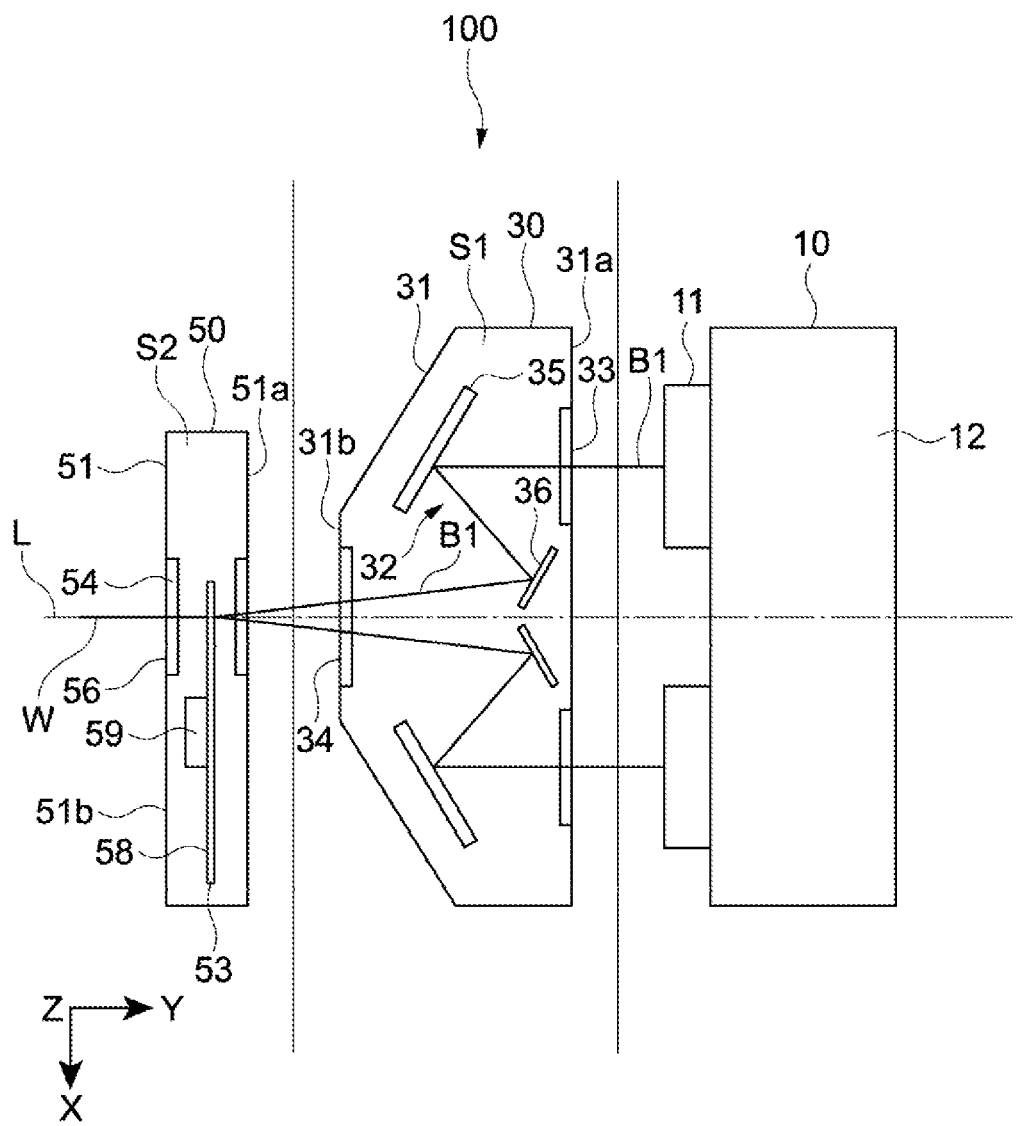
FIG. 4 A diagram schematically showing an internal configuration example of the light source apparatus.

FIG. 2 is a perspective view showing a configuration example of the light source apparatus 100. FIG. 3 is a plan view of the light source apparatus 100 as viewed from above. FIG. 4 is a diagram schematically showing an internal configuration example of the light source apparatus 100. The light source apparatus 100 includes a light source unit 10, an optical system unit 30, a phosphor unit 50, and a base portion 80 that supports them.

A side from which white light W is emitted is set as a front side, and a side opposite to the front side is set as a rear side. The light source unit 10, the optical system unit 30, and the phosphor unit 50 are mounted on the base portion 80 so as to be arranged in this order from the front side to the rear side. It should be noted that FIG. 4 shows a state where the respective units are set apart from one another, and illustration of the base portion 80 is omitted.

The base portion 80 has an elongated shape extending in one direction. An elongated longitudinal direction of the base portion 80 becomes a left-right direction (X direction) of the light source apparatus 100, and a short-side direction orthogonal to the longitudinal direction becomes a front-back direction (Y direction). Further, a direction orthogonal to both the longitudinal direction and the short-side direction becomes a height direction (Z direction) of the light source apparatus 100.

The light source unit 10 includes two light source blocks 11 arranged in the X direction and a heat sink 12 arranged on the rear side thereof, and these are configured as a single unit. Each of the light source blocks 11 includes a plurality of laser light sources (laser diodes) 13 (see FIG. 6). The plurality of laser light sources 13 are arranged such that light can be emitted toward the front side.

In this embodiment, the plurality of laser light sources 13 are each a blue laser light source capable of oscillating blue laser light B1 having a peak wavelength of an emission intensity within a wavelength range of 400 nm to 500 nm, for example. Instead of the laser light source, other solid-state light sources such as an LED may be used. In addition, the present technology is also applicable to a case where a mercury lamp, a xenon lamp, or the like is used instead of the solid-state light source.

The optical system unit 30 has a first casing portion 31 that forms a first space S1 and a light collection optical system 32 accommodated in the first space S1. The first casing portion 31 includes a rear surface 31a connected to the light source unit 10 and a front surface 31b connected to the phosphor unit. At positions of the rear surface 31a opposing the light source blocks 11, two first light-incident ports 33 that the blue laser light B1 enters are formed. On the front surface 31b, a first light-emitting port 34 from which the blue laser light B1 collected by the light collection optical system 32 exits is formed.

The light collection optical system 32 includes two aspherical mirrors 35 (illustrated in plate shape in figure) and two plane mirrors 36. The aspherical mirrors 35 reflect the blue laser light B1 that enters the first light-incident ports 33 along the front-back direction as if folding it back and collect the light. The plane mirrors 36 reflect the light reflected by the aspherical mirrors 35 toward the first light-emitting port 34. The configuration of the light collection optical system 32 is not limited, and an arbitrary configuration may be adopted.

The phosphor unit 50 includes a second casing portion 51 that forms a second space S2, a wheel portion 53 accommodated in the second space S2, and a light-emitting lens 54. The second casing portion 51 includes a rear surface 51a connected to the optical system unit 30 and a front surface 51b on a side from which the white light W is emitted. A second light-incident port 55 that the blue laser light B1 emitted from the first light-emitting port 34 enters is formed on the rear surface 51a. On the front surface 51b, a second light-emitting port 56 from which the white light W exits is formed. The second light-emitting port 56 is hermetically sealed by the light-emitting lens 54. The white light W is emitted along an optical axis L.

The wheel portion 53 includes a phosphor wheel 58 and a motor 59. The phosphor wheel 58 is arranged at a position where the blue laser light B1 that enters the second light-incident port 55 is collected at a predetermined point. The motor 59 is driven by electric power supplied via a flexible substrate 60 and causes the phosphor wheel 58 to rotate.

Figure 5:
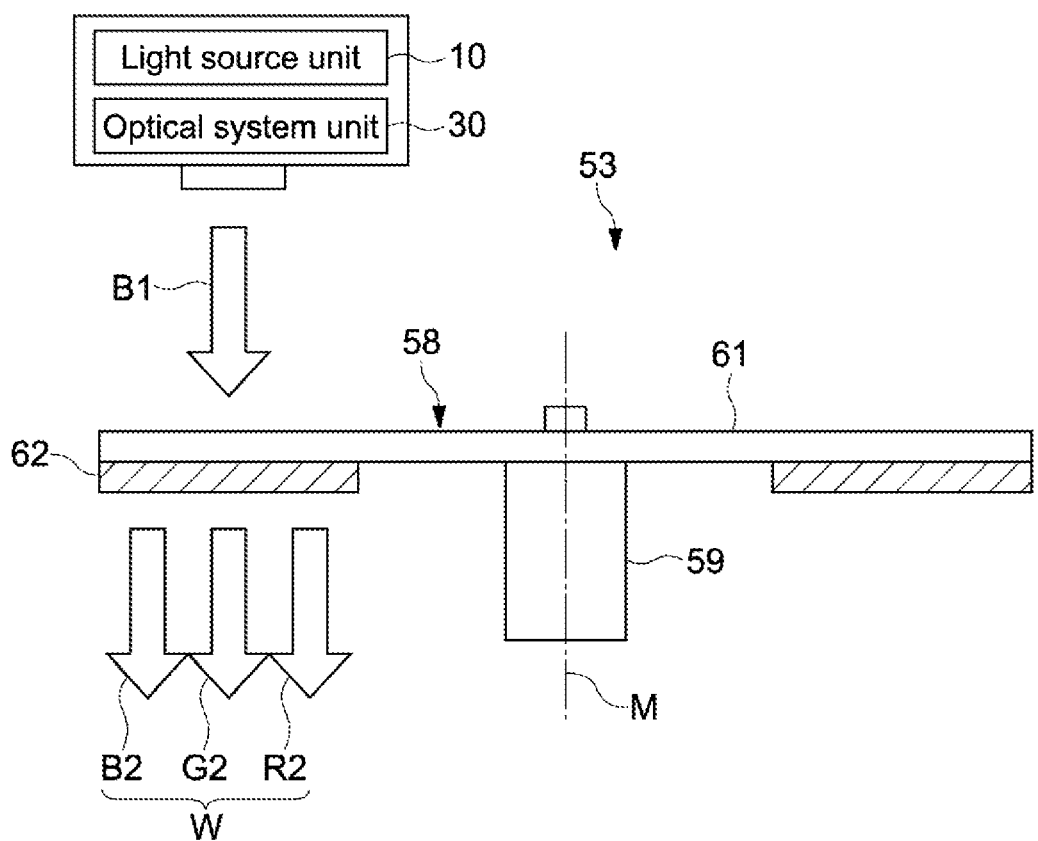
FIG. 5 A diagram for explaining generation of white light by a phosphor unit.

FIG. 5 is a diagram for explaining generation of the white light W by the phosphor unit 50. The phosphor wheel 58 includes a disc-shaped substrate 61 through which the blue laser light B1 is transmitted, and a phosphor layer 62 provided on that substrate 61. As the substrate 61, for example, a crystalline member such as quartz and sapphire is used.

The phosphor layer 62 includes a fluorescent substance that is excited by the blue laser light B1 to emit fluorescence. By the phosphor layer 62, a part of the blue laser light B1 emitted from the optical system unit 30 is converted into light within a wavelength range from the red wavelength range to the green wavelength range (i.e., yellow light). Further, the phosphor layer 62 transmits a part of the blue laser light B1 as it is. Therefore, light including blue excitation light and yellow fluorescence is emitted from the phosphor layer 62.

As the fluorescent substance included in the phosphor layer 62, for example, a YAG (yttrium-aluminum-garnet)-based phosphor is used. It should be noted that the type of fluorescent substance, the wavelength range of light to be excited, and the wavelength range of visible light generated by the excitation are not limited.

The motor 59 is connected to a center of the substrate 61. As the motor 59 is driven, the phosphor wheel 58 rotates about a rotation shaft M.

In a state where the substrate 61 is rotated by the motor 59, the blue laser light B1 is emitted from the light source unit 10. The blue laser light B1 is irradiated onto the phosphor layer 62 so as to draw a circle relatively to the rotation of the substrate 61. As a result, as shown in FIG. 5, white light W including blue laser light B2 that has been transmitted through the phosphor layer 62 and the green light G2 and red light R2 as visible light from the phosphor layer 62 is emitted.

In this embodiment, a first unit is realized by the light source unit 10 and the optical system unit 30. Further, the light source blocks 11 correspond to a light source portion. Furthermore, the phosphor unit 50 corresponds to a second unit. The phosphor layer 62 corresponds to a light-emitting body.

As shown in FIG. 4 and the like, an optical axis direction of the blue laser light B1 emitted from the light source unit 10, an optical axis direction of the blue laser light B1 emitted from the optical system unit 30, and an optical axis direction of the white light W emitted from the phosphor unit 50 are set in the same direction. As a result, a space for arranging the heat sink 12 can be easily secured on the rear side of the light source blocks 11, thus enabling the plurality of laser light sources 13 to be cooled efficiently.

Further, the light source unit 10, the optical system unit 30, and the phosphor unit 50 can be assembled along the optical axis direction of the white light W. This makes it possible to prevent deviation of the optical axis at the time of assembly. In particular, the optical system unit 30 and the phosphor unit 50 can be mutually connected in a state where the optical axis of the blue laser light B1 (first optical axis) and the optical axis of the white light W (second optical axis) are arranged on the same straight line, in a direction of the straight line. As a result, it becomes possible to sufficiently prevent deviation of the optical axis and exert extremely-high assembly accuracy.

Further, since the base portion 80 enables the respective units to be easily and accurately supported in a predetermined positional relationship, it becomes possible to simplify an assembly process or shorten a process time while exhibiting high assembly accuracy. It should be noted that a method of assembling the respective units on the base portion 80 is not limited, and an arbitrary method such as fitting, adhesion, and screwing may be adopted.

[Dustproof Structure Portion]

Each of the first unit constituted of the light source unit 10 and the optical system unit 30 and the second unit which is the phosphor unit 50 includes a dustproof structure portion. The dustproof structure portion is a structure for hermetically sealing the respective members arranged along the optical path from the laser light sources 13 to the light-emitting lens 54 from outside when the light source apparatus 100 is assembled and used.

For example, when the light source apparatus 100 is assembled and used, the respective members may be hermetically sealed within one sealed space. Alternatively, a plurality of sealed spaces may be formed, and the members may be respectively accommodated in the sealed spaces. The configuration for realizing one or more sealed spaces for sealing the respective members at the time the light source apparatus 100 is assembled corresponds to the dustproof structure portion.

The dustproof structure portion configured in the first unit becomes a first dustproof structure portion and is configured to cover at least the two light source blocks 11. The dustproof structure portion configured in the second unit becomes a second dustproof structure portion and is configured to cover at least the phosphor layer 62. Hereinafter, a specific configuration example of the first and second dustproof structure portions will be described.

Figure 6:
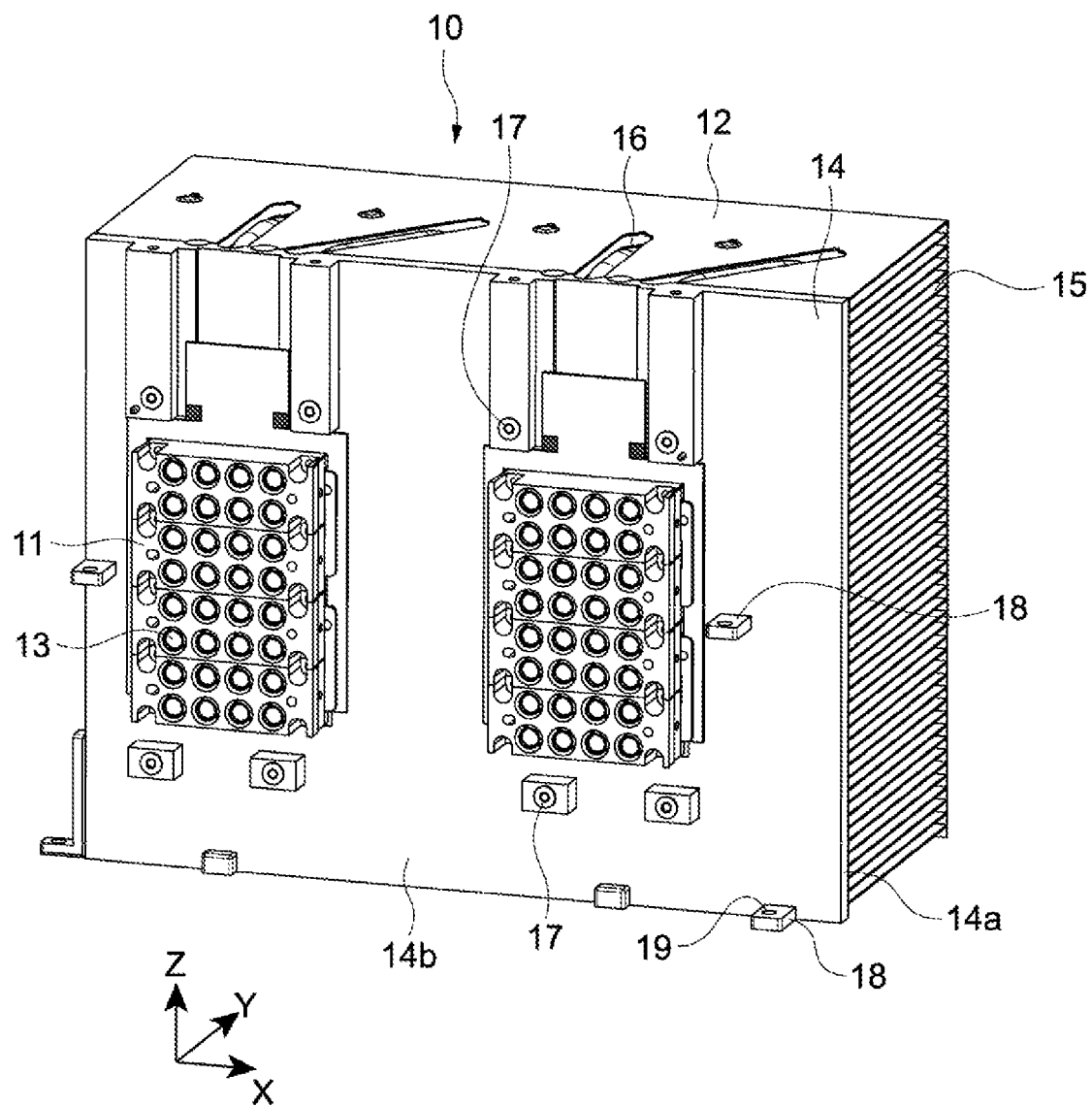
FIG. 6 A perspective view showing a configuration example of a light source unit.

FIG. 6 is a perspective view showing a configuration example of the light source unit 10. The light source unit 10 includes a base portion 14, the heat sink 12 in which a plurality of fins 15 and a plurality of heat pipes 16 are formed integrally, and the two light source blocks 11. The heat sink 12 is connected to a rear surface 14*a* of the base portion 14. The light source blocks 11 are connected at predetermined positions on a front surface 14*b* of the base portion 14.

For example, there are cases where it is necessary to change a specification regarding the wavelength, luminance output, number, and the like of light emitted from the laser light sources 13. In this case, by connecting the light source blocks 11 including a desired number of laser light sources 13 having desired characteristics to the base portion 14, the specification can be changed easily. Also, the heat sink 12 can be changed as appropriate to that including a desired heat radiation function (thermal diffusion function). For example, by changing to a compact heat sink 12, it becomes possible to reduce the size of the entire apparatus.

It should be noted that the heat sink 12 may be detachable from the base portion 14 or may be formed integrally with the base portion 14. In the case where the heat sink 12 is formed integrally, it is only necessary to change the specification of the heat sink 12 including the base portion 14 and connect the light source blocks 11 to the base portion 14. A method of connecting the light source blocks 11 to the base portion 14 is not limited, and adhesion, screwing, or the like only needs to be performed as appropriate.

As shown in FIG. 5, in the base portion 14, 4 insertion holes 17 are formed in a periphery of each of the light source blocks 11. Further, protrusion portions 18 to be connected to the base portion 80 are formed at two positions at substantially the center in the Z direction and one position at a lower end portion. A screw hole 19 is formed in each of the protrusion portions 18.

Figure 7A:
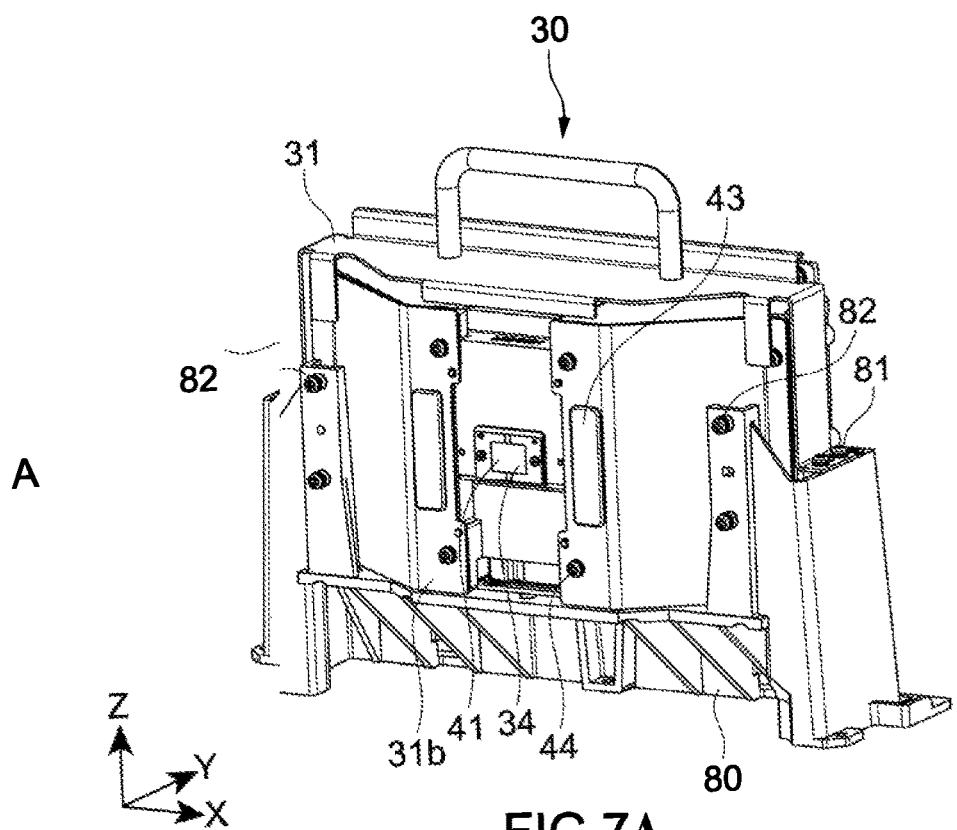
FIG. 7A Perspective views showing a configuration example of an optical system unit.
Figure 7B:
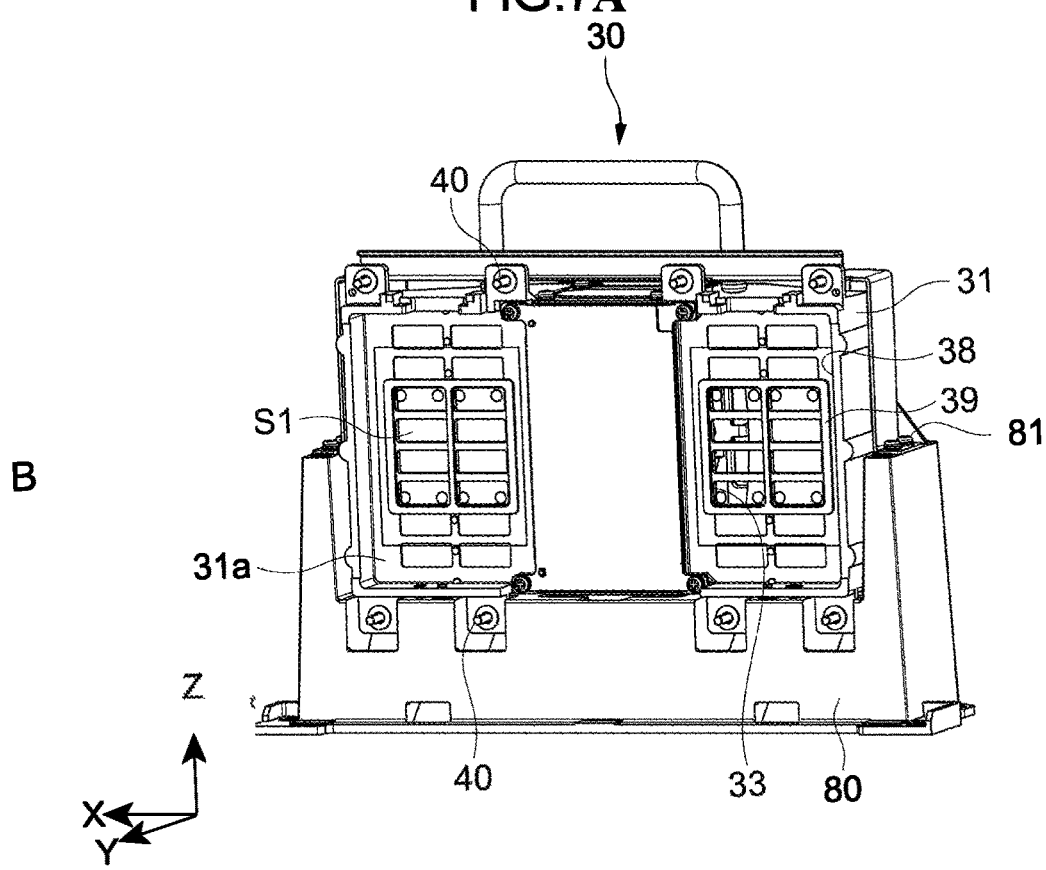
FIG. 7B Perspective views showing another configuration example of an optical system unit.

FIG. 7 are perspective views showing a configuration example of the optical system unit 30. FIG. 7A is a view seen from the front side, and FIG. 7B is a view seen from the rear side. The optical system unit 30 is attached to the base portion 80 by screws 81 at both ends on left- and right-hand sides.

As shown in FIG. 7B, on the rear surface 31*a* of the first casing portion 31, two concave portions 38 that accommodate the light source blocks 11 when connecting to the light source unit 10 are formed. The first light-incident ports 33 that each become an opening are respectively formed on surfaces inside the concave portions 38. A space more on the front side than the first light-incident ports 33 becomes the first space S1 covered by the first casing portion 31.

A sealing member 39 is formed in a periphery of the first light-incident ports 33. A specific configuration of the sealing member 39 is not limited, and an arbitrary sealing member with which the first light-incident ports 33 can be sealed, such as a sealing member, sheet member, and cushion member formed of rubber, felt, or the like, may be used, for example.

In the example shown in FIG. 7B, the first light-incident ports 33 are each formed in a size corresponding to 4 rows of the laser light sources 13 at the center of the light source block 11 shown in FIG. 6. Of course, the present technology is not limited to this, and the first light-incident port 33 may be formed in a size corresponding to the entire light source block 11.

Further, rod-shaped protrusion members 40 are provided in a periphery of each of the concave portions 38 on the rear surface 31*a* of the first casing portion 31. The light source unit 10 is connected to the optical system unit 30 so that these protrusion members 40 are inserted into the insertion holes 17 of the light source unit 10 shown in FIG. 6. Then, the 3 protrusion portions 18 of the light source unit 10 are screwed to the base portion 80, to thus fix the light source unit 10 (see FIG. 2).

When the light source unit 10 is connected to the optical system unit 30, the light source blocks 11 are accommodated in the concave portions 38, and the 4 rows of laser light sources 13 at the center are arranged at positions opposing the first light-incident ports 33. The sealing member 39 formed in the periphery of each of the first light-incident ports 33 is sufficiently brought into contact with a center portion of the light source blocks 11. Therefore, the first light-incident ports 33 are sufficiently sealed (hermetically sealed) by the light source blocks 11. As a result, it becomes possible to sufficiently prevent dust and the like from entering the first space S1 from the first light-incident ports 33.

As shown in FIG. 7A, the first light-emitting port 34 is formed at the center of the front surface 31 *b* of the first casing portion 31. In this embodiment, the first light-emitting port 34 is hermetically sealed by a transparent member 41 formed of glass or the like. Therefore, when the optical system unit 30 and the light source unit 10 are connected, the first space S1 formed by the first casing portion 31 becomes a sealed space.

It may be necessary to change a specification on a size, position, number, focal length, and the like of the aspherical mirrors 35 and the plane mirrors 36, for example, regarding the light collection optical system 32 accommodated inside the optical system unit 30. In this case, the specification change can be easily realized by attaching the optical system unit 30 that accommodates the light collection optical system 32 including a desired configuration, to the base portion 80.

Figure 8A:
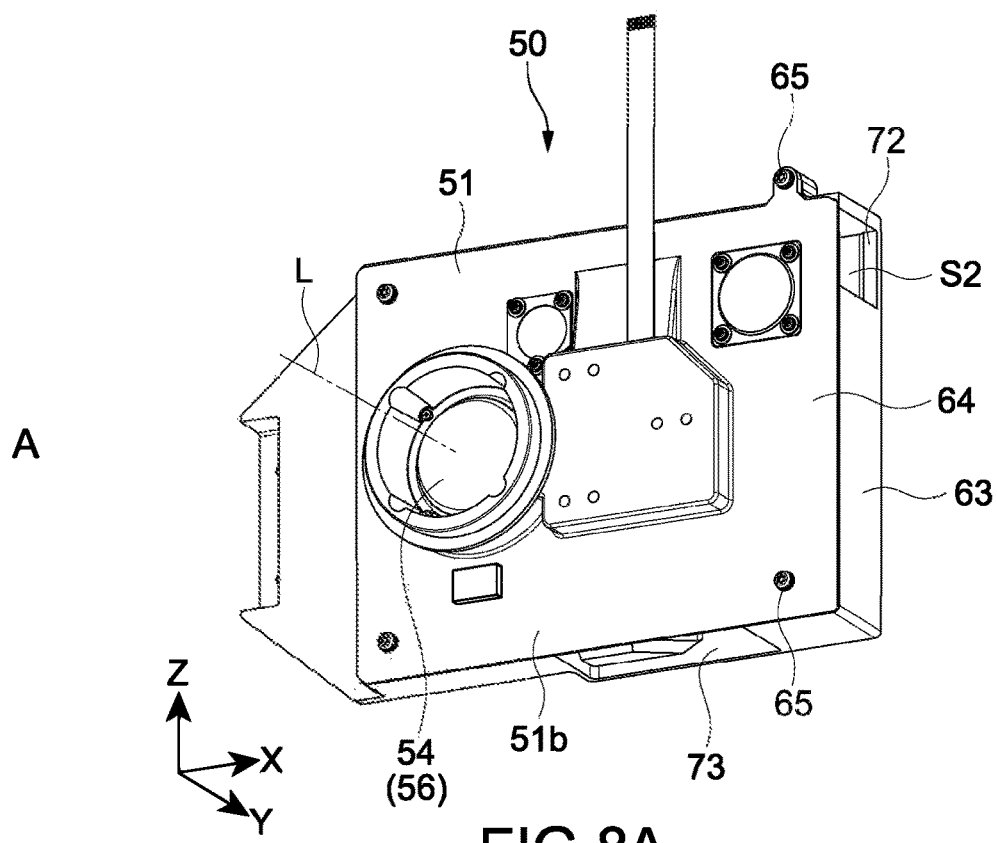
FIG. 8A Perspective views showing a configuration example of the phosphor unit.
Figure 8B:
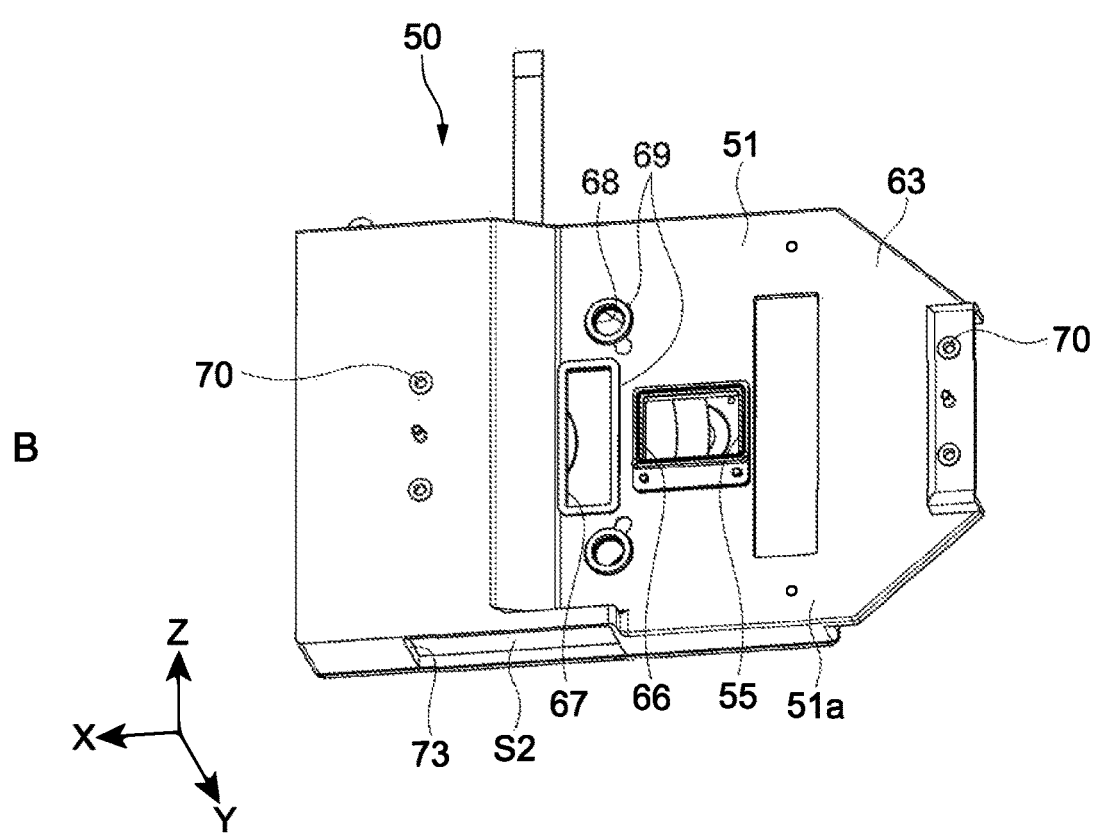
FIG. 8B Perspective views showing another configuration example of the phosphor unit.

FIG. 8 are perspective views showing a configuration example of the phosphor unit 50. FIG. 8A is a view as seen from the front side, and FIG. 8B is a view as seen from the rear side.

The second casing portion 51 of the phosphor unit 50 includes a base portion 63 and a cover portion 64. A rear surface of the base portion 63 becomes the rear surface 51*a* of the second casing portion 51. A front surface of the cover portion 64 becomes the front surface 51*b* of the second casing portion 51. By connecting the base portion 63 and the cover portion 64 by 4 screws 65 shown in FIG. 8A, the second space S2 that accommodates the wheel portion 53 and the light-emitting lens 54 is formed.

As shown in FIG. 8B, the second light-incident port 55 that becomes an opening is formed at substantially the center of the rear surface 51*a*. A sealing member 66 is provided in a periphery of the second light-incident port 55. Further, a rectangular opening 67 is formed adjacent to the second light-incident port 55. Two circular openings 68 are formed at positions above and below the opening 67. A sealing member 69 is formed around a periphery of each of the openings 67 and 68.

Further, 4 screw holes 70 are formed on the rear surface 51*a* of the second casing portion 51. By positioning the screw holes 70 at the positions of the 4 screws 82 shown in FIG. 7A and screwing them, the base portion 63 of the second casing portion 51 is fixed to the base portion 80. It should be noted that the screwing is performed before attaching the wheel portion 53.

When the base portion 63 is attached, the second light-incident port 55 and the first light-emitting port 34 are connected. Further, the sealing member 66 formed in the periphery of the second light-incident port 55 is sufficiently brought into contact with the transparent member 41 attached to the first light-emitting port 34. As a result, the second light-incident port 55 is sufficiently hermetically sealed.

A rectangular protrusion portion 43 formed adjacent to the first light-emitting port 34 shown in FIG. 7A is inserted into the rectangular opening 67. Since the sealing member 69 formed in the periphery of the opening 67 is sufficiently brought into contact with the periphery of the protrusion portion 43, the opening 67 is sufficiently hermetically sealed.

Screws 44 positioned above and below the protrusion portion 43 are inserted into the circular openings 68. Since the sealing members 69 formed in the periphery of the openings 68 are sufficiently brought into contact with the periphery of the screws 44, the openings 68 are sufficiently hermetically sealed.

The wheel portion 53 and the light-emitting lens 54 are arranged, and the cover portion 64 is connected to the base portion 63. Accordingly, the second casing portion 51 forming the second space S2 is formed. Since all the openings formed on the rear surface 51b are hermetically sealed, dust and the like are sufficiently prevented from entering the second space S2 via these openings.

As shown in FIG. 8A, since the second light-emitting port 56 formed on the front surface 51b of the second casing portion 51 is hermetically sealed by the light-emitting lens 54, dust and the like do not enter the second space S2.

It may become necessary to change specifications regarding the phosphor unit 50, such as the configuration of the phosphor wheel 58, the type of the phosphor layer 62, the configuration of the motor 59, and optical characteristics of the light-emitting lens 54. In this case, for example, by removing the cover portion 64, replacement of components and the like can be performed with ease.

It should be noted that in this embodiment, the wheel portion 53 and the like are arranged after the base portion 63 is attached, to thus form the second casing portion 51. Of course, the present technology is not limited to this, and the phosphor unit 50 may be attached to the base portion 80 after the second casing portion 51 is formed and the phosphor unit 50 is assembled. In any case, since the phosphor unit 50 is configured as a single unit, it is possible to flexibly cope with various specification changes.

As shown in FIG. 8A, a suction port 72 as an opening is formed on a side surface of the second casing portion 51. An exhaust port 73 as an opening is formed on the lower surface of the second casing portion 51. In this embodiment, when the light source apparatus 100 is assembled and used, a cooling apparatus 90 is attached so as to block the suction port 72 and the exhaust port 73. As a result, heat generated from the phosphor wheel 58 can be efficiently cooled.

Figure 9:
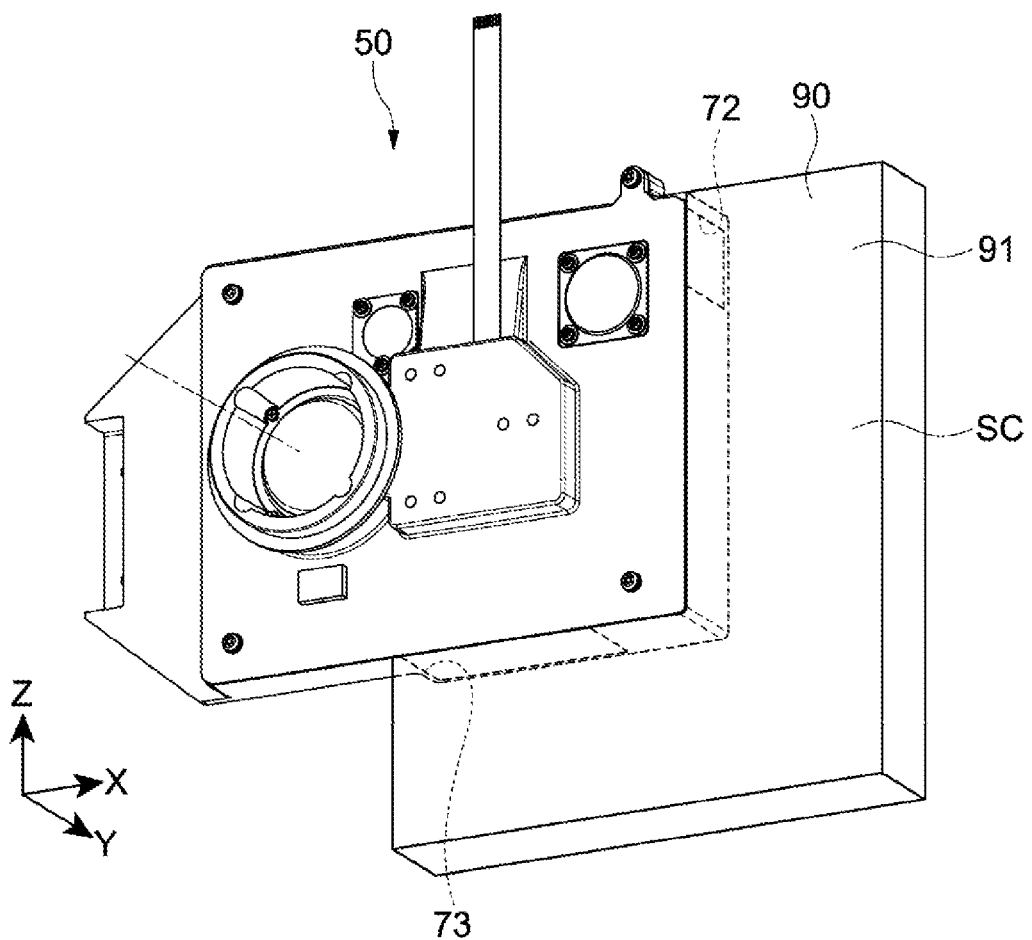
FIG. 9 A schematic diagram showing a configuration example of a cooling apparatus.

FIG. 9 is a schematic diagram showing a configuration example of the cooling apparatus 90. The cooling apparatus 90 includes a casing portion 91 that forms a cooling space SC and a cooling mechanism (not shown) formed inside the casing portion 91. The cooling mechanism includes, for example, a filter provided so as to block the suction port 72 and a cooling circulation mechanism that cools air exhausted from the exhaust port 73 and causes it to circulate to the suction port 72. When the cooling apparatus 90 is attached, the second space S2 and the cooling space SC communicate with each other via the suction port 72 and the exhaust port 73, to thus become a sealed space as a whole.

As described above, in this embodiment, when the light source apparatus 100 is assembled, the first space S1 formed by the first casing portion 31 becomes a sealed space. Further, when the cooling apparatus 90 is attached, the second space S2 and the cooling space SC become a sealed space as a whole. This means that, when the first and second casing portions 31 and 51 are connected, the second light-incident port 55 as the opening is hermetically sealed and the second space S2 becomes a part of the sealed space.

The laser light sources 13 and the light collection optical system 32 are accommodated in the first space S1 that becomes the sealed space. The phosphor wheel 58, the motor 59, and the light-emitting lens 54 are accommodated in the second space S2 that becomes a part of the sealed space. As a result, it becomes possible to sufficiently prevent an influence of dust and the like.

In this embodiment, the first casing portion 31, the sealing member 39, and the transparent member 41 function as the first dustproof structure portion. Further, the second casing portion 51 and the sealing members 66 and 69 function as the second dustproof structure portion. Of course, the present technology is not limited to the configuration described above, and an arbitrary dustproof structure portion may be configured.

As described above, in the light source apparatus 100 according to this embodiment, the light source unit 10 and the optical system unit 30 are configured as the first unit, and the phosphor unit 50 is configured as the second unit. Then, the light source apparatus 100 is assembled by mutually connecting these units. Accordingly, it becomes possible to flexibly cope with a specification change regarding the light source blocks 11, a specification change regarding the light collection optical system 32, and various specification changes regarding the phosphor wheel 58 and the like. For example, it is possible to easily change only the unit (block) that requires a specification change. When forming the respective units, it is necessary to perform positioning of the openings and the portions for hermetically sealing the openings, positioning of the openings that are in communication with each other, and the like between the respective units. Typically, outer shapes of connection portions of the first and second casing portions 31 and 51 are formed according to a predetermined rule so as to enable these positioning to be performed, though of course is not limited thereto.

Further, the first dustproof structure portion is formed in the first unit, and the second dustproof structure portion is formed in the second unit. This makes it possible to sufficiently prevent the influence of dust and the like on the light source blocks 11, the phosphor wheel 58, and the like. Accordingly, it becomes possible to prevent lowering of luminance of the laser light sources 13, a reduction in an amount of visible light generated from the phosphor wheel 58, and the like.

By forming the first and second dustproof structure portions, one or more sealed spaces that seal the respective members in the light source apparatus 100 are formed when the light source apparatus 100 is assembled and used. This is extremely advantageous in downsizing the apparatus as compared to a case where dustproofing is performed by a casing or the like that covers the entire light source apparatus 100. For example, even in a case where openings are formed in the first and second spaces S1 and S2, since the openings are hermetically sealed by connection with other members, a sealed space having a minimum size necessary can be formed. Accordingly, it becomes possible to realize the apparatus as a minimum sealed light source.

Further, with the configuration that covers the entire light source apparatus 100, it is necessary to change other components in order to cope with a specification change of a specific member. In contrast, the present technology is capable of flexibly coping with various specification changes while exhibiting a high dustproof effect.

Other Embodiments

The present technology is not limited to the embodiment described above, and various other embodiments can be realized.

The first light-emitting port 34 of the first casing portion 31 shown in FIG. 7A may be opening, and the second light-incident port 55 of the second casing portion 51 shown in FIG. 8B may be blocked by a transparent member or the like. Then, the first light-emitting port 34 may be hermetically sealed when the first and second casing portions 31 and 51 are connected to each other. Of course, a sealing member may be provided.

Further, it is also possible for both of the first light-emitting port 34 and the second light-incident port 55 to be openings and the first light-emitting port 34 and the second light-incident port 55 to come in communication with each other when the first and second casing portions 31 and 51 are connected to each other. A sealed space including the first and second spaces S1 and S2 may also be formed. In this case, a sealing member may be provided at least in the periphery of the first light-emitting port 34 or the periphery of the second light-incident port 55.

Specifically, in a case where an opening is formed in each of the first and second casing portions 31 and 51, the openings themselves may be hermetically sealed, or the opening may come in communication with the opening of the other casing portion. In other words, unless the opening communicates with an external space, the method of sealing the opening is not limited.

It is also possible for both the first light-emitting port 34 and the second light-incident port 55 to not be openings and be blocked by transparent members or the like. For example, the first and second units are respectively configured so that both the first and second spaces S1 and S2 become enclosed spaces. Then, the light source apparatus 100 may be assembled by mutually connecting the first and second units. It should be noted that if the transparent member or the like is arranged on the optical path, a loss of light may occur. Therefore, it is advantageous to set the second light-incident port 55 as an opening as shown in FIG. 8B for obtaining high luminance of the light source apparatus 100.

Figure 10:
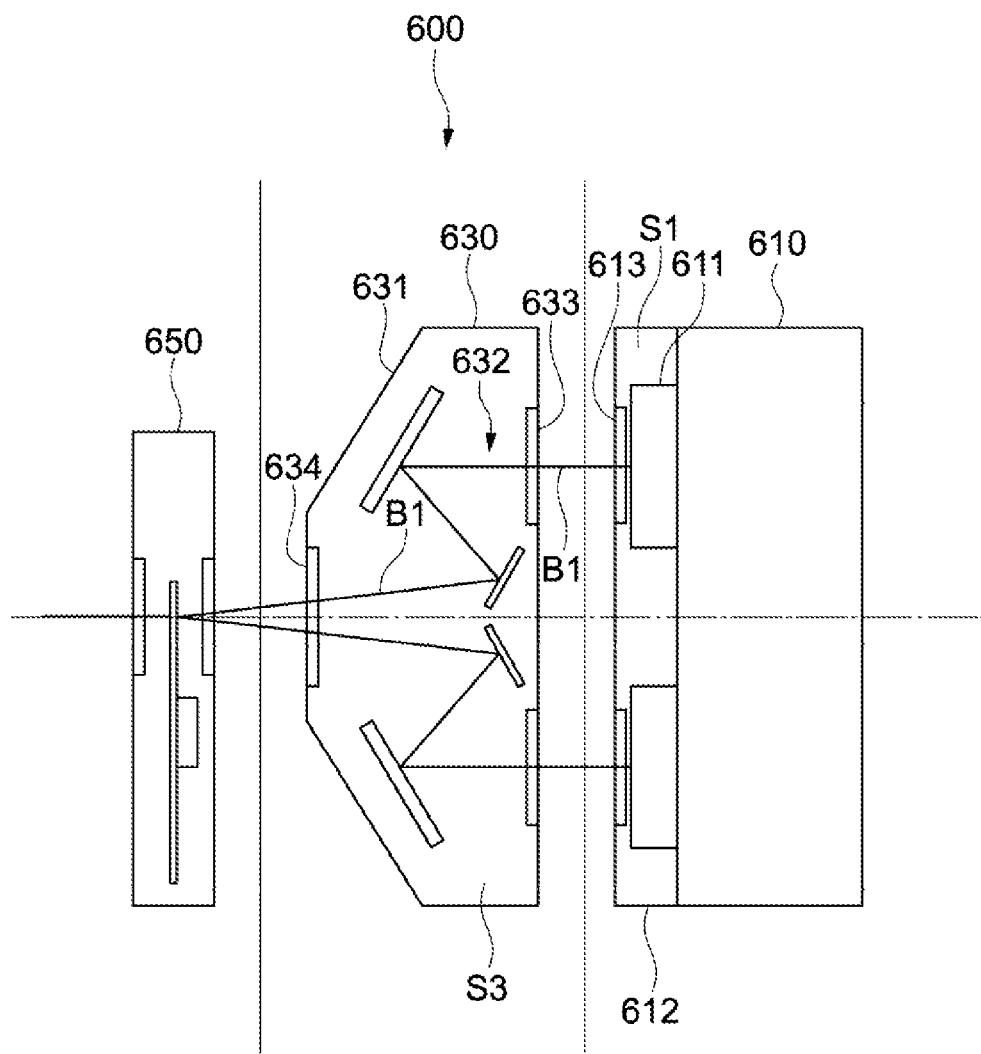
FIG. 10 A schematic diagram showing a configuration example of a light source apparatus according to another embodiment.

FIG. 10 is a schematic diagram showing a configuration example of a light source apparatus according to another embodiment. In this light source apparatus 600, a first casing portion 612 that forms the first space S1 including light source blocks 611 is included in a light source unit 610. Therefore, the first unit is realized by the light source unit 610 alone. In the first casing portion 612, first light-emitting ports 613 are formed at positions opposing the light source blocks 611.

An optical system unit 630 is configured as a third unit. The optical system unit 630 includes an optical system casing portion 631 that forms an optical system space S3 including a light collection optical system 632. The optical system casing portion 631 includes third light-incident ports 633 that blue laser light B1 emitted from the first unit enters and a third light-emitting port 634 from which the blue laser light B1 collected by the light collection optical system 632 exits.

A phosphor unit 650 functions as the second unit, similar to that described above. The phosphor unit 650 is connected to the light source unit 610 as the first unit via the optical system unit 630.

The dustproof structure portion described above is formed in each of the light source unit 610, the optical system unit 630, and the phosphor unit 650 (become first, second, and third dustproof structure portions).

Each of the first space S1 (light source portion space), the second space S2 (light-emitting body space), and the optical system space S3 shown in FIG. 10 may be a sealed space. Alternatively, two adjacent spaces may communicate with each other to form a sealed space including these. Of course, all the spaces may communicate with each other to form a sealed space as a whole or form a part of a predetermined sealed space.

It should be noted that the descriptions above are given on the case where the light source apparatus is divided into 3 blocks of the light source block, the optical system block, and the phosphor block. However, what kind of blocks the light source apparatus is to be divided into is not limited and may be set arbitrarily. For example, the light source apparatus may be divided into 4 or more finer blocks, and the respective blocks may be unitized. It is only necessary to form a dustproof structure portion in each of the units and accommodate the respective members of the light source apparatus in any of the one or more sealed spaces in the case of assembling and using the light source apparatus.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) A light source apparatus, including:
 a first unit including a light source portion and a first dustproof structure portion that covers the light source portion; and
 a second unit that is connected to the first unit and includes a light-emitting body that emits visible light by being excited by emission light emitted from the light source portion and a second dustproof structure portion that covers the light-emitting body.

(2) The light source apparatus according to (1), in which
 the first dustproof structure portion includes a first casing portion including a first light-emitting port from which the emission light exits, the first casing portion forming a first space including the light source portion.

(3) The light source apparatus according to (2), in which
 the second dustproof structure portion includes a second casing portion that includes a light-incident port that the emission light emitted from the first light-emitting port enters and a second light-emitting port from which light including the visible light exits, the second casing portion forming a second space including the light-emitting body.

(4) The light source apparatus according to (3), in which
 either one of the first light-emitting port and the light-incident port is an opening, and
 the first casing portion and the second casing portion are mutually connected such that the opening is hermetically sealed and each of the first space and the second space becomes a sealed space or a part of the sealed space.

(5) The light source apparatus according to (3), in which
 each of the first light-emitting port and the light-incident port is an opening, and
 the first casing portion and the second casing portion are mutually connected such that the first light-emitting port and the light-incident port are in communication with each other and a sealed space including the first space and the second space is formed.

(6) The light source apparatus according to (4) or (5), in which the first dustproof structure portion includes a sealing member provided in a periphery of the first light-emitting port.

(7) The light source apparatus according to any one of (4) to (6), in which the second dustproof structure portion includes a sealing member provided in a periphery of the light-incident port.

(8) The light source apparatus according to (3), in which each of the first space and the second space is a sealed space.

(9) The light source apparatus according to any one of (2) to (8), in which the first unit includes a light source unit including the light source portion, and the first casing portion includes a light-incident port that the emission light enters and is connected to the light source unit.

(10) The light source apparatus according to (9), in which the first unit includes an optical system unit including an optical system that collects the emission light in the light-emitting body and the first casing portion that accommodates the optical system in the first space, and the second unit is connected to the optical system unit.

(11) The light source apparatus according to (9) or (10), in which the first dustproof structure portion includes a sealing member provided in a periphery of the light-incident port of the first casing portion.

(12) The light source apparatus according to any one of (1) to (11), further including a base portion that supports each of the first unit and the second unit in a predetermined positional relationship.

(13) The light source apparatus according to any one of (1) to (12), in which the first unit emits the emission light along a first optical axis, the second unit emits light including the visible light along a second optical axis, and the first unit and the second unit are mutually connected in a state where the first optical axis and the second optical axis are arranged on the same straight line, along a direction of the straight line.

(14) The light source apparatus according to any one of (1) to (8), further including a third unit that is connected to the first unit and includes an optical system that collects the emission light in the light-emitting body and a third dustproof structure portion that covers the optical system, in which the second unit is connected to the first unit via the third unit.

(15) The light source apparatus according to (14), in which the third dustproof structure portion includes an optical system casing portion including a light-incident port that the emission light emitted from the first unit enters and a light-emitting port from which light collected by the optical system exits, the optical system casing portion forming an optical system space including the optical system.

(16) The light source apparatus according to (15), in which the optical system space is in communication with at least one of a light source portion space including the light source portion and a light-emitting body space including the light-emitting body, and becomes a part of a predetermined sealed space.

(17) The light source apparatus according to (15), in which the optical system space is a sealed space.

REFERENCE SIGNS LIST

B1, B2 blue laser light
G2, G3 green light
L optical axis of white light
R2, R3 red light
S1 first space
S2 second space
S3 optical system space
W white light
10, 610 light source unit
11, 611 light source block
30, 630 optical system unit
31, 612 first casing portion
32, 632 light collection optical system
33 first light-incident port
34, 613 first light-emitting port
39, 66, 69 sealing member
41 transparent member
50, 650 phosphor unit
51 second casing portion
54 light-emitting lens
55 second light-incident port
56 second light-emitting port
62 phosphor layer
80 base portion
90 cooling apparatus
100, 600 light source apparatus
200 image generation system
400 projection system
500 image display apparatus
631 Optical housing unit
633 light-incident port of optical system casing portion
634 light-emitting port of optical system casing portion

The invention claimed is:

1. A light source apparatus, comprising:
a light source and a first dustproof structure that includes a first casing covering the light source, the first casing including a first light-emitting port from which emission light emitted from the light source exits;
a light-emitting body connected to the light source, the light-emitting body receiving the emission light and converting part of the received emission light into visible light; and
a second dustproof structure that covers the light-emitting body, the second dustproof structure including a second casing that includes a light-incident port, the light-incident port being connected to the first light-emitting port.

2. The light source apparatus according to claim 1, wherein
the light-incident port receives the emission light emitted from the first light-emitting port,
the visible light exits from a second light-emitting port, and
the second casing forms a second space including the light-emitting body.

3. The light source apparatus according to claim 2, wherein
each of the first light-emitting port and the light-incident port is an opening, and the first casing and the second casing are connected such that a sealed space including the first space and the second space is formed.

4. The light source apparatus according to claim 2, wherein
each of the first space and the second space is a sealed space.

5. The light source apparatus according to claim 2, wherein
either one of the first light-emitting port and the light-incident port is an opening, and
the first casing and the second casing are connected such that the opening is hermetically sealed and each of the first space and the second space becomes a sealed space or a part of the sealed space.

6. The light source apparatus according to claim 5, wherein
the first dustproof structure includes a sealing member provided in a periphery of the first light-emitting port.

7. The light source apparatus according to claim 5, wherein
the second dustproof structure includes a sealing member provided in a periphery of the light-incident port.

8. The light source apparatus of claim 6, wherein
the second dustproof structure includes a sealing member provided in a periphery of the light-incident port, and
the sealing member provided in the periphery of the first light-emitting port is in contact with the sealing member provided in the periphery of the light-incident port.

9. The light source apparatus according to claim 1, wherein
the first casing includes another light-incident port that receives the emission light and is connected to the light source.

10. The light source apparatus according to claim 9, further comprising:
an optical system that collects the emission light, the first casing covering the optical system in the first space, wherein
the light-emitting body is connected to the optical system.

11. The light source apparatus according to claim 9, wherein
the first dustproof structure includes a sealing member provided in a periphery of the other light-incident port of the first casing.

12. The light source apparatus according to claim 1, further comprising:
a base that supports the light source and the light-emitting body in a predetermined positional relationship.

13. The light source apparatus according to claim 1, wherein
the light source emits the emission light along a first optical axis,
the light-emitting body emits light including the visible light along a second optical axis, and
the light source and the light-emitting body are connected in a state where the first optical axis and the second optical axis are arranged on a same straight line, along a direction of the same straight line.

14. The light source apparatus according to claim 1, further comprising:
an optical system that is connected to the light source, the optical system collecting the emission light;
and a third dustproof structure that covers the optical system,
wherein
the light-emitting body is connected to the light source via the optical system.

15. The light source apparatus according to claim 14, wherein
the third dustproof structure includes an optical system casing, the optical system casing including another light-incident port that receives the emission light emitted from the light source and a third light-emitting port from which light collected by the optical system exits, the optical system casing forming an optical system space including the optical system.

16. The light source apparatus according to claim 15, wherein
the optical system space is connected to at least one of a light source space including the light source and a light-emitting body space including the light-emitting body, and becomes a part of a predetermined sealed space.

17. The light source apparatus according to claim 15, wherein
the optical system space is a sealed space.

18. The light source apparatus of claim 1, wherein the light-emitting body includes a phosphor layer.

19. An image display apparatus, comprising:
a light source apparatus including
a light source and a first dustproof structure that includes a first casing covering the light source, the first casing including a first light-emitting port from which emission light emitted from the light source exits, and
a light-emitting body connected to the light source, the light-emitting body receiving the emission light and converting part of the received emission light into visible light,
a second dustproof structure that covers the light-emitting body, the second dustproof structure including a second casing that includes a light-incident port, the light-incident port being connected to the first light-emitting port;
an image generation system including
an illumination optical system that irradiates light from the light source apparatus onto an image generation device, and
the image generation device that generates an image on a basis of the irradiated light; and
a projection system that projects the image generated by the image generation device.

* * * * *